US011209638B2

(12) United States Patent
Lockman et al.

(10) Patent No.: US 11,209,638 B2
(45) Date of Patent: Dec. 28, 2021

(54) SYSTEMS AND METHODS FOR SUPPORTING AND POSITIONING BODY TISSUE SAMPLES IN A MICROSCOPE

(71) Applicant: West Virginia University, Morgantown, WV (US)

(72) Inventors: Paul Lockman, Morgantown, WV (US); Afroz Mohammad, Minneapolis, MN (US); Neal Shah, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 308 days.

(21) Appl. No.: 16/026,398

(22) Filed: Jul. 3, 2018

(65) Prior Publication Data

US 2019/0011689 A1 Jan. 10, 2019

Related U.S. Application Data

(60) Provisional application No. 62/528,769, filed on Jul. 5, 2017.

(51) Int. Cl.
*G02B 21/34* (2006.01)

(52) U.S. Cl.
CPC .................... *G02B 21/34* (2013.01)

(58) Field of Classification Search
CPC .... G02B 21/34; G02B 21/0052; G02B 21/26; G01N 21/29; G01N 1/28; G01N 33/4833; G01N 33/483; G01N 1/286; G01N 1/06; G01N 1/31; G01N 1/312; A61B 10/0096; A61B 10/0266; A61B 10/0275; A61B 10/0233; A61B 1/32; A61B 17/0206; A61B 17/701; A61B 1/313; A61B 17/7083; A61B 90/06; A61B 17/7037; A61B 10/0283; A61B 17/0293; A61F 2/30756; A61F 2/4618
USPC .......................................................... 359/391
See application file for complete search history.

(56) References Cited

U.S. PATENT DOCUMENTS

| 3,883,398 | A | * | 5/1975 | Ono | ........................ | C12M 23/04 |
| | | | | | | 435/305.3 |
| 5,272,081 | A | * | 12/1993 | Weinreb | .................. | C12M 23/12 |
| | | | | | | 435/243 |
| 6,567,214 | B2 | * | 5/2003 | Lorincz | ..................... | G01N 1/30 |
| | | | | | | 359/396 |
| 8,030,622 | B2 | * | 10/2011 | Nishiyama | .......... | G01N 23/2204 |
| | | | | | | 250/306 |
| 2005/0249725 | A1 | * | 11/2005 | Schenk | .................... | A61P 25/28 |
| | | | | | | 424/141.1 |

(Continued)

*Primary Examiner* — Stephone B Allen
*Assistant Examiner* — Rahman Abdur
(74) *Attorney, Agent, or Firm* — Thomas | Horstemeyer, LLP (57) ABSTRACT

A stage apparatus is disclosed for supporting and positioning a body tissue sample in a microscope. The stage apparatus has (a) an elongated base mount having a longitudinal body extending between a first end and a second end, (b) means for attaching the first end of the base to a mount or platform associated with the microscope, (c) a tissue mount having a tissue well attached to an elongated mount stem, the tissue well of sufficient size and shape to store the body tissue sample, and (d) means for attaching the second end of the base mount and the tissue mount, the tissue mount being removable and separable from the base mount.

13 Claims, 6 Drawing Sheets

(56) References Cited

U.S. PATENT DOCUMENTS

| | | | |
|---|---|---|---|
| 2016/0109357 A1* | 4/2016 | Lorbeer | G01N 21/0303 250/576 |
| 2017/0146447 A1* | 5/2017 | Mohan | G01N 33/487 |
| 2018/0164569 A1* | 6/2018 | Brinkman | G02B 21/367 |

* cited by examiner

SYSTEMS AND METHODS FOR SUPPORTING AND POSITIONING BODY TISSUE SAMPLES IN A MICROSCOPE

CROSS-REFERENCE TO RELATED APPLICATIONS

This application claims priority to, and the benefit of, co-pending U.S. provisional application entitled "THE CT LOCK" having Ser. No. 62/528,769, filed on Jul. 5, 2017, which is hereby incorporated by reference in its entirety.

FIELD OF INVENTION

The present invention generally relates to microscopy, and more particularly, to a stage apparatus and method for supporting and positioning a body tissue sample in a microscope.

BACKGROUND

Body tissue samples can be analyzed by placing on a support stage that can be used with a microscope. Typically a tissue sample can be mounted to a support stage using dental gum to secure the sample to the top of a support stage, which can often be troublesome and inconsistent. Mounting tissue samples in agarose can be used to preserve the sample during scanning. However, this can reduce scanning resolution and make it difficult to study capillaries and other small structures, but is often necessary to keep the tissue preserved.

SUMMARY OF INVENTION

Disclosed herein are embodiments of a stage apparatus designed to support and position a body tissue sample in a microscope One embodiment, among others, can be summarized as an apparatus having a microscope and a stage apparatus with body tissue sample therein. The stage apparatus has an elongated base mount and a tissue mount. The base mount has a longitudinal body extending between a first end and a second end. The first end of the base is attached to a mount associated with the microscope. The second end has an opening extending inwardly into the longitudinal body. The tissue mount has a tissue well attached to an elongated mount stem. The tissue well stores a body tissue sample. The mount stem extends into the opening of the second end of the base mount. The tissue mount is removable and separable from the base mount.

Another embodiment, among others, is a stage apparatus for supporting and positioning a body tissue sample in a microscope. The stage apparatus has (a) an elongated base mount having a longitudinal body extending between a first end and a second end, (b) means for attaching the first end of the base to a mount or platform associated with the microscope, (c) a tissue mount having a tissue well attached to an elongated mount stem, the tissue well of sufficient size and shape to store the body tissue sample, and (d) means for attaching the second end of the base mount and the tissue mount, the tissue mount being removable and separable from the base mount.

Other embodiments, methods, apparatus, features, and advantages of the present invention of this disclosure will be or become apparent to one with skill in the art upon examination of the following drawings and detailed description. It is intended that all such additional embodiments, methods, apparatus, features, and advantages be included within this description, be within the scope of the present disclosure, and be protected by the accompanying claims.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

The present disclosure relates to systems and methods for supporting and positioning body tissue samples in a microscope. Specifically, the present disclosure relates to a stage apparatus comprising a base mount and a tissue mount that is designed to support and position a body tissue sample (e.g., small brain matter samples) in a microscope.

Figure 1:
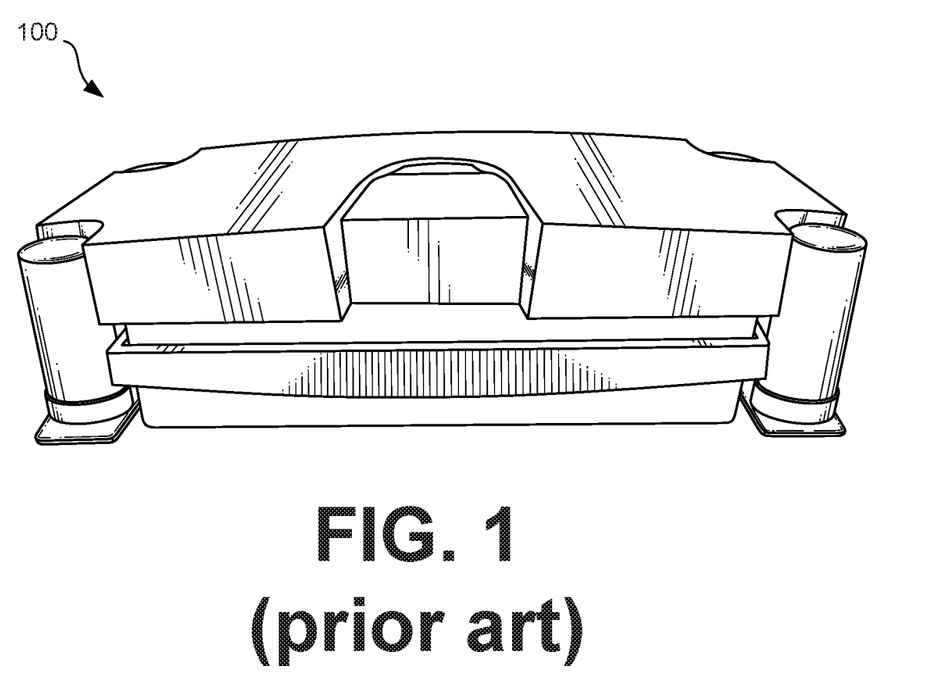
FIG. 1 illustrates a prior art microscope, for example but not limited to, a Bruker Micro CT, wherein the stage apparatus of the present disclosure is utilized to support a body tissue sample, for example but not limited to, a brain tissue sample.

FIG. 1 illustrates an example of a prior art microscope 100 that is used to analyze body tissue samples. The stage apparatus of the present disclosure can be used with the microscope 100 to analyze the body tissue sample, as can be appreciated. The microscope can be any type of microscope including a Bruker Micro CT.

Figure 2:
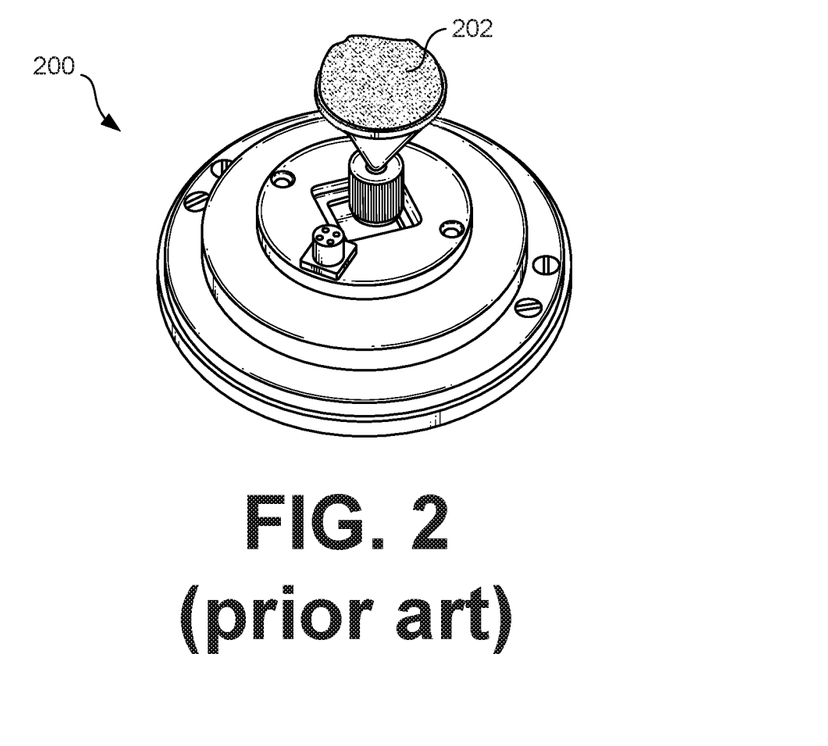
FIG. 2 illustrates a prior art stage for supporting the body tissue sample within the microscope of FIG. 1.
Figure 3:
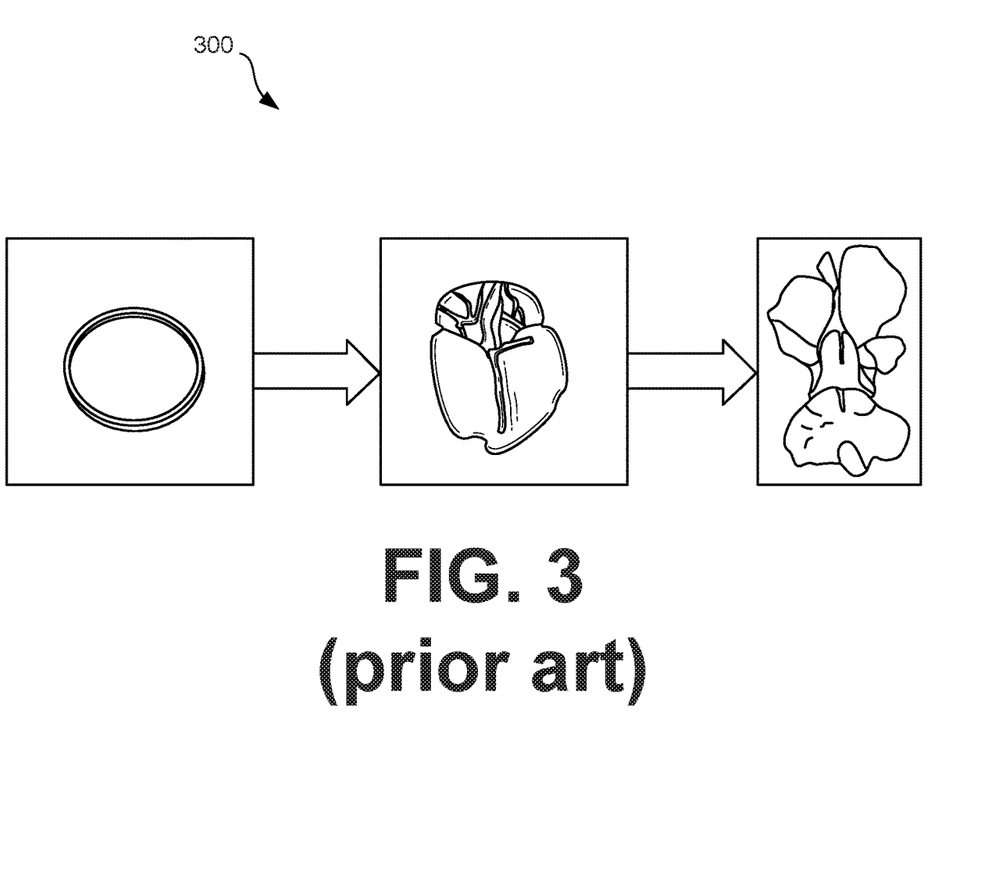
FIG. 3 illustrates a prior art process of mounting the body tissue in agarose in a dental gum.

FIG. 2 illustrates an example of a prior art support stage for mounting body tissue samples. In particular, an existing method to mount a tissue sample involves using dental gum 202 to secure the sample to the top of a support stage 200, which can often be troublesome and inconsistent. FIG. 3 illustrates an example of a known method 300 for mounting brain tissue to a known stage apparatus. Mounting the brain tissue in agarose can be used to preserve the sample during scanning. However, this reduces scanning resolution and makes it difficult to study capillaries and other small structures, but is often necessary to keep the tissue preserved.

The use of the dental gum 202 with the existing stage design 200 results in inconsistent analysis from sample to sample due to the variation in sample placement each time. Moreover, if the sample is not mounted in agarose, then the tissue will dehydrate and shrink, presenting further issues during scanning. In order to mitigate these issues, an alternative method of mounting the sample is needed.

Figure 4:
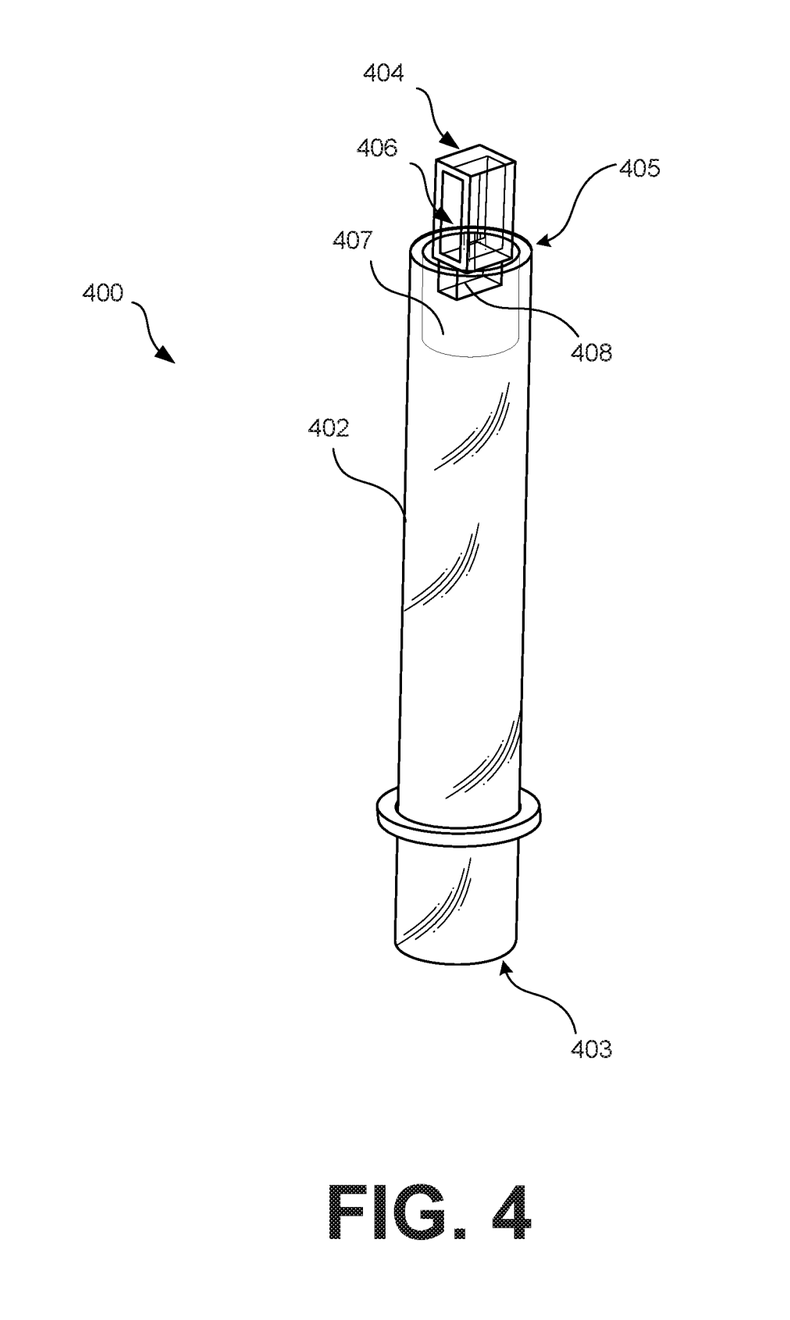
FIG. 4 illustrates a perspective view of a stage apparatus according to various embodiments of the present disclosure

The stage apparatus and methods of mounting the body tissue using the stage apparatus of the present disclosure can mitigate the above noted issues. FIG. 4 illustrates a perspective view of an example stage apparatus 400 according to various embodiments of the present disclosure. The stage apparatus 400 of the present disclosure can mount into the existing mounting location of a microscope 100, such as the Bruker Micro CT microscope. The stage apparatus 400 can include a base mount 402 and a tissue mount 404. The base mount 402 comprises a longitudinal body extending between a first end 403 and a second end 405. The first end 403 of the base mount is configured to attach to a microscope mount 412 (FIGS. 6A and 6B) associated with the microscope 100. The second end 405 of the base mount 402 comprises an opening 407 extending inwardly into the longitudinal body.

The tissue mount 404 comprises a body 410 coupled to an elongated mount stem 408. The body 410 can comprise a tissue well 406 of sufficient size and shape to store a body tissue sample. The mount stem 408 is configured to extend into the opening 407 of the second end 405 of the base mount 402 for consistent placement. According to various embodiments, the tissue mount 404 is removable and separable from the base mount 402.

Figure 5A:
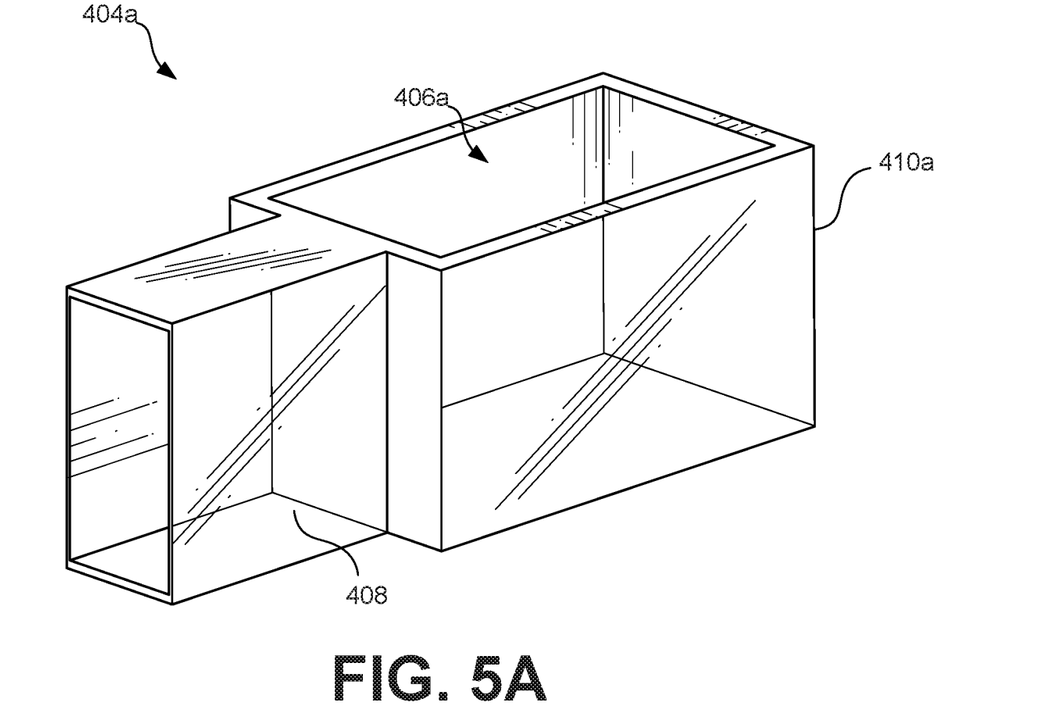
FIG. 5A illustrates a perspective view of an example tissue mount of the stage apparatus of the present disclosure according to various embodiments of the present disclosure.
Figure 5B:
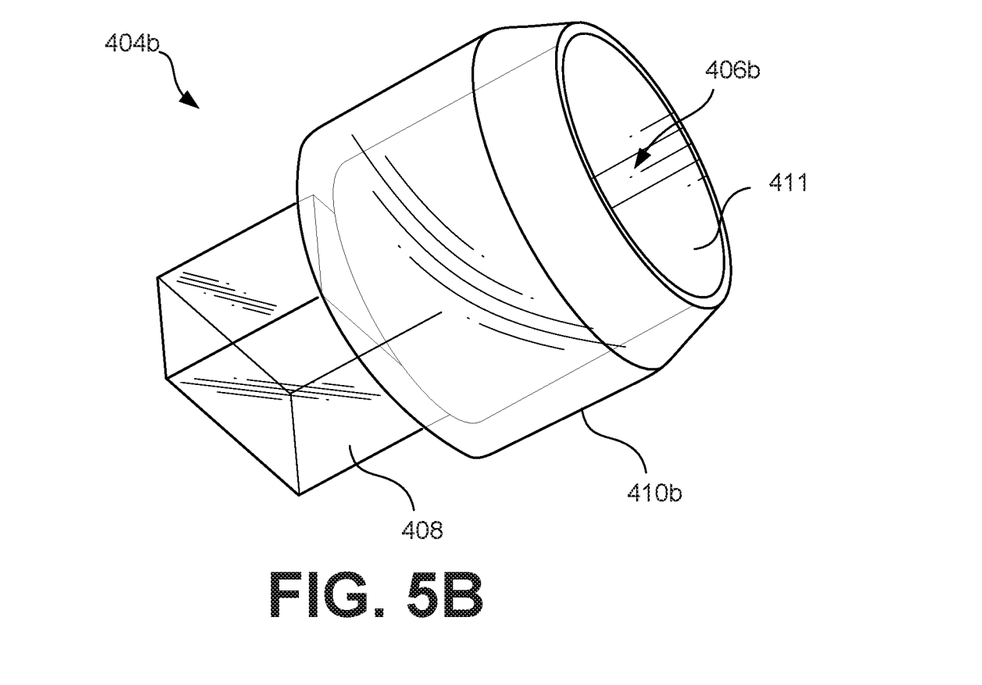
FIG. 5B illustrates a perspective view of another example tissue mount of the stage apparatus of the present disclosure according to various embodiments of the present disclosure.

FIGS. 5A and 5B illustrate example embodiments of the tissue mount 404 according to various embodiments of the present disclosure. For example, FIG. 5A illustrates an example of a tissue mount 404a comprising an elongated body 410a with sides. The elongated body 410a generally has a rectangular shaped cross section with a rectangular shaped internal chamber 406a for storing the body tissue sample. The elongated body 410a is coupled to a mount stem 408 used consistent placement.

FIG. 5B illustrates an example of a tissue mount 404b comprising a cylindrical body 410b with a cylindrical internal chamber 406b for storing the body tissue sample. The cylindrical internal chamber 406b is defined by a circular internal side wall 411 of the tissue mount 404b. The elongated body 410b is coupled to a mount stem 408 used to insert the tissue mount 404b in the base mount 402. Although the tissue mounts 404a, 404b of FIGS. 5A and 5B are generally rectangular-shaped and cylindrical-shaped, respectively, it should be noted that the shape of the tissue mount body is not limited to a rectangular or cylindrical cross section.

Figure 6A:
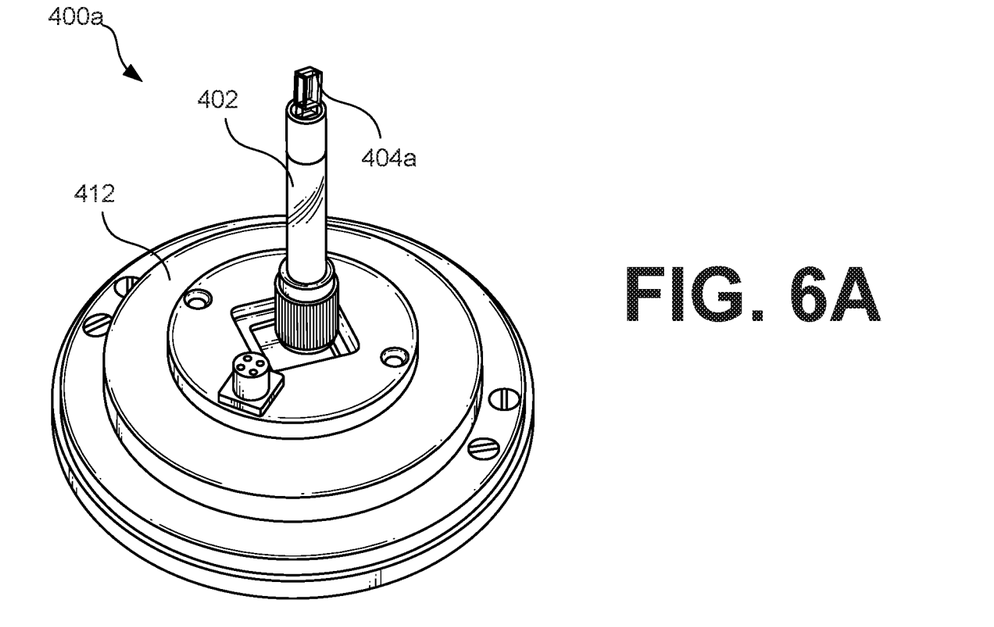
FIG. 6A illustrates a first embodiment of a stage apparatus of the present disclosure which includes a tissue mount attached to a base mount, the base mount being attached to a microscope mount.
Figure 6B:
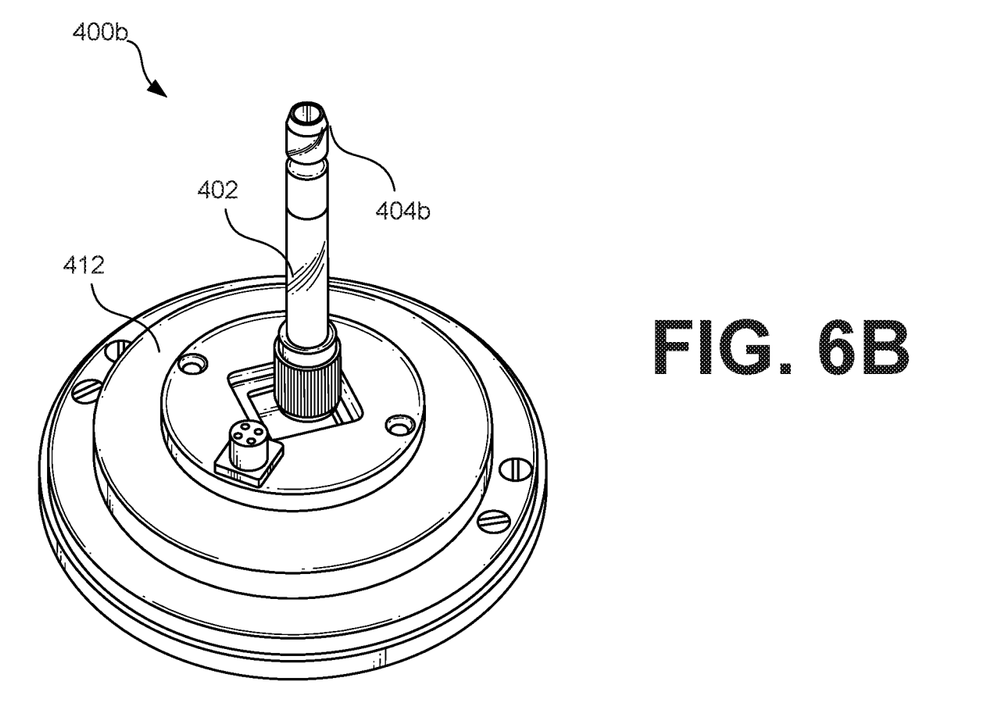
FIG. 6B illustrates a second embodiment of a stage apparatus of the present disclosure which includes a tissue mount attached to a base mount, the base mount being attached to a microscope mount.

FIG. 6A illustrates a first embodiment of the stage apparatus 400a of the present disclosure which includes a tissue mount 404a of FIG. 5A attached to a base mount 402, the base mount 402 being attached to a microscope mount 412. FIG. 6B illustrates a second embodiment of a stage apparatus 400b of the present disclosure which includes a tissue mount 404b of FIG. 5B attached to a base mount 402, the base mount 402 being attached to a microscope mount 412. In this embodiment, the tissue mount 404b is generally larger than the tissue mount 404a of FIG. 6A.

As previously stated, the tissue mount 404 secures and seals the tissue sample for scanning. To seal the tissue sample, the tissue (not shown) is placed into the tissue well 406 and sealed on the open end with a sealing agent. The sealing agent can comprise a generally clear poly acrylic material, such nail, for example nail polish, and/or any other type of sealing agent as can be appreciated. This sealing agent is applied by placing a thin layer of the sealing agent on the exposed area, which does not interfere with scanning resolution.

This stage apparatus 400 and its parts can be fabricated by any of the standard practices known in industry including but not limited to machining, injection molding, and three dimensional (3D) printing. The manufacturing material can comprise a polycarbonate material and/or any other type of material as can be appreciated that does not interfere with the scanning functionality associated with the microscope.

The stage apparatus 400 of the present disclosure has at least the following features/benefits: (a) places sample in the same position every single time; (b) positions the sample in the center of the stage consistently for highest scanning resolution; (c) multiple tissue mounting designs are available; (d) seals the tissue sample to keep it from dehydrating; (e) testing has demonstrated an increase in scanning resolution from ~5 microns to ~500 nanometers (nm); (f) a stencil can be used to "cookie cut" the tissue sample, providing reproducibility; (g) the tissue mount 404 can be disposable; and (h) the base mount 402 is reusable.

Figure 7:
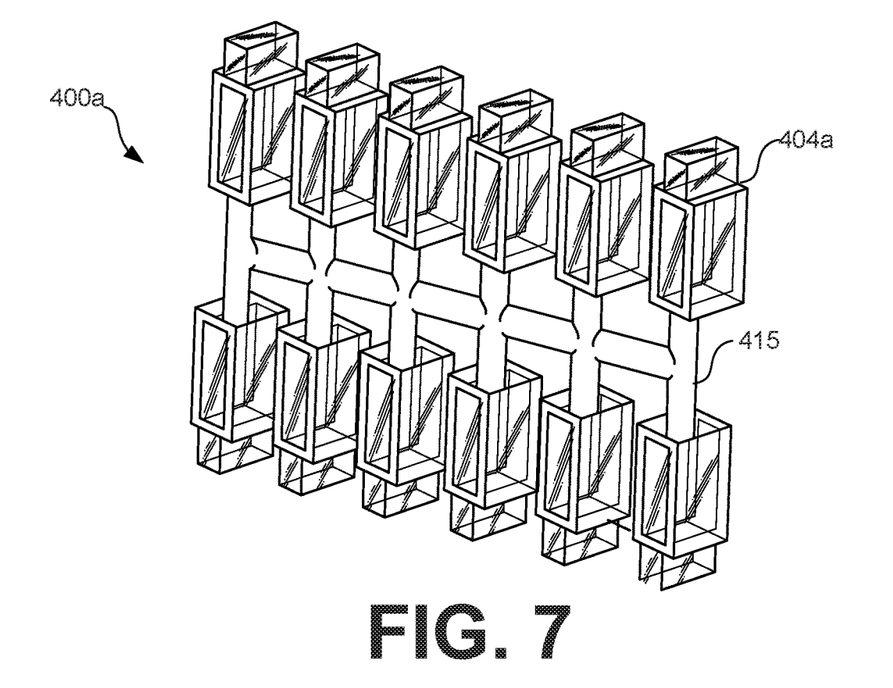
FIG. 7 illustrates a manufacturing method that can be employed in connection with manufacturing the first embodiment of the tissue mount associated with the first embodiment of the stage apparatus of FIG. 6A.
Figure 8:
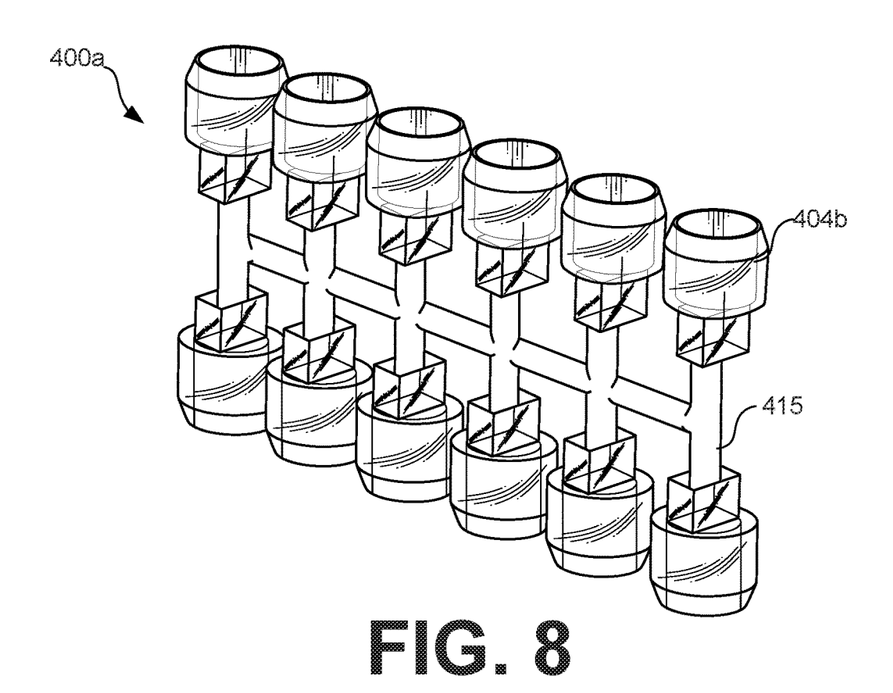
FIG. 8 illustrates a manufacturing method that can be employed in connection with manufacturing the second embodiment of the tissue mount associated with the second embodiment of the stage apparatus of FIG. 6B.

In some examples, the tissue mounts 404 can be disposable. FIGS. 7 and 8 illustrate perspective views of multiple disposable tissue mounts 404 organized on a rack 415 according to various embodiments. FIGS. 7 and 8 further illustrate a method of manufacturing the tissue mounts 404 showing that multiple tissue mounts 404 can be removeably attached on a rack 415. The tissue mounts 404 of FIGS. 7 and 8 correspond to pre-production prototypes that have been designed and tested. These prototypes have also been designed for manufacturability. The base mount 402 can remains reusable while the tissue mounts 404 can be broken off the rack 415, used, and discarded (or reused if desired). FIG. 7 illustrates the tissue mount 404a of FIG. 5A and FIG. 8 illustrates the tissue mount 404b of FIG. 5B.

It should be emphasized that the described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. An apparatus, comprising:
a microscope; and
a tissue stage configured for placement within the microscope, the tissue stage comprising:
an elongated base mount having a longitudinal body extending between a first end and a second end, the first end of the elongated base mount configured to be detachably attached to the microscope, the second end having an opening extending inwardly into the longitudinal body; and
a tissue mount comprising a tissue well structure and an elongated mount stem extending perpendicularly away from a sidewall of the tissue well structure, the elongated mount stem having a rectangular cross section, the elongated mount stem being sized and shaped smaller than the tissue well structure, the tissue well structure being sized and shaped for storing a body tissue sample, the elongated mount stem being inserted in and removably coupled to the opening of the second end of the elongated base mount such that the opening of the second end of the elongated base mount substantially surrounds the elongated mount stem, and the sidewall of the tissue well structure extending perpendicularly and outwardly from the second end of the elongated based mount.

2. The apparatus of claim 1, wherein the body tissue sample comprises brain tissue.

3. The apparatus of claim 1, wherein the tissue well structure comprises an elongated opening that is defined by a plurality of side walls.

4. The apparatus of claim 1, wherein the tissue well structure comprises a cylindrical shaped opening that is defined by a circular internal side wall of the tissue mount.

5. The apparatus of claim 1, further comprising a sealing agent, the sealing agent being disposed over an opening of the tissue well structure, the sealing agent sealing the body tissue sample within the tissue well structure.

6. The apparatus of claim 5, wherein the sealing agent comprises a poly acrylic.

7. A stage apparatus for supporting a body tissue sample, comprising:
an elongated base mount having a longitudinal body extending between a first end and a second end, the first end of the elongated base mount configured for attachment to a microscope, the second end having an opening extending inwardly into the longitudinal body; and
a tissue mount comprising a tissue well structure and an elongated mount stem extending longitudinally and perpendicularly away from an exterior surface of the tissue well structure, the elongated mount stem having a rectangular cross section, the elongated mount stem being sized and shaped smaller than the tissue well structure, the tissue well structure being of sufficient size and shape to store the body tissue sample, the elongated mount stem extending into the opening of the second end of the elongated base mount such that the opening of the second end of the elongated base mount substantially surrounds the elongated mount stem, the tissue well structure extending perpendicularly and outwardly from the second end of the elongated base mount, and the tissue mount being removable and separable from the elongated base mount.

8. The stage apparatus of claim 7, wherein the tissue well structure comprises an elongated opening that is defined by a plurality of side walls.

9. The stage apparatus of claim 7, wherein the tissue well structure comprises a cylindrical shaped opening that is defined by a circular internal side wall of the tissue mount.

10. The stage apparatus of claim 7, wherein the tissue well structure comprises the body tissue sample.

11. The stage apparatus of claim 7, wherein tissue mount structure comprises a rectangular cross section.

12. The stage apparatus of claim 7, wherein the stage apparatus comprises a polycarbonate material.

13. The stage apparatus of claim 7, wherein the tissue mount comprises a first tissue mount, and further comprising a plurality of tissue mounts removably attached to a rack, individual tissue mounts of the plurality of tissue mounts being configured for replacement of the first tissue mount following detachment of the first tissue mount from the elongated base mount.

* * * * *